United States Patent
Gudipati et al.

(10) Patent No.: US 10,797,963 B2
(45) Date of Patent: Oct. 6, 2020

(54) COMPOSITION OF CUSTOM KEY PERFORMANCE INDICATORS FOR REAL-TIME ANALYSIS OF NETWORK TELEMETRY EVENTS

(71) Applicant: VMware, Inc., Palo Alto, CA (US)

(72) Inventors: Aditya Gudipati, Los Angeles, CA (US); Rakesh Misra, Palo Alto, CA (US); Manu Bansal, Palo Alto, CA (US); Srikanth Hariharan, Sunnyvale, CA (US); Ben Basler, Palo Alto, CA (US); Rajiv Ramanathan, San Jose, CA (US); Rohan Agarwal, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/563,869

(22) Filed: Sep. 7, 2019

(65) Prior Publication Data

US 2020/0084118 A1 Mar. 12, 2020

Related U.S. Application Data

(60) Provisional application No. 62/728,356, filed on Sep. 7, 2018.

(51) Int. Cl.
*G06F 15/173* (2006.01)
*H04L 12/24* (2006.01)
*H04L 12/26* (2006.01)

(52) U.S. Cl.
CPC .............. *H04L 41/22* (2013.01); *H04L 41/14* (2013.01); *H04L 43/028* (2013.01)

(58) Field of Classification Search
CPC ........ H04L 41/14; H04L 41/22; H04L 43/028
USPC ........................................................ 709/224
See application file for complete search history.

(56) References Cited

U.S. PATENT DOCUMENTS

| | | | | |
|---|---|---|---|---|
| 9,204,319 | B2* | 12/2015 | Ouyang | H04W 16/18 |
| 10,216,621 | B1* | 2/2019 | Rutten | G06F 16/2455 |
| 10,628,603 | B1* | 4/2020 | de Boer | G06F 21/604 |
| 2016/0104076 | A1* | 4/2016 | Maheshwari | G06N 20/00 |
| | | | | 706/12 |
| 2016/0381580 | A1* | 12/2016 | Kwan | H04L 41/5009 |
| | | | | 370/252 |
| 2017/0331673 | A1* | 11/2017 | Iyer | H04L 41/16 |

\* cited by examiner

*Primary Examiner* — Frantz B Jean
(74) *Attorney, Agent, or Firm* — Clayton, McKay & Bailey, PC

(57) ABSTRACT

A graphical user interface ("GUI") allows for the creation of custom key performance indicators ("KPIs") for real-time analysis of network telemetry events. The GUI can include options for defining variables based on event attributes. These can correspond to events that exist in input telemetry streams at a stream processor. The GUI can allow creation of a formula based on these variables. An aggregation section specifies how the output of the formula is aggregated. This can be based on group, aggregation function, and time period. A manager process causes the stream processor to apply the custom KPI definition to real-time input streams. An output KPI stream can then be routed to a destination for analysis.

20 Claims, 4 Drawing Sheets

FIG. 3

CREATE KPI — 300

- NAME: THROUGHPUT — 307, 305
- TAGS: — 315
- VARIABLES: — 310
  - V1 | BEARER_TRAFFIC_REP ▽ | PER_DRB_PDCP_ACKVOL_DL ▽ | ✕
  - V2 | BEARER_TRAFFIC_REP ▽ | PER_DRB_PDCP_LAST_TTI_TRANSV... ▽ | ✕
  - V3 | BEARER_TRAFFIC_REP ▽ | PER_DRB_THP_TIME_DL ▽ | ✕
  - 320, 325, 330, 335
- FORMULA: 8*(V1 - V2)/(1000 * V3) — 340
- OUTPUT UNITS: BPS ▽ — 345
- GROUP BY: CELL ▽ | FUNCTION: HISTOGRAM ▽ | TIME: 1 MIN ▽ — 350, 355
- RETAIN FOR: 60 DAYS ▽ — 365, 370 | BIN BOUNDARIES: 1000,10000,500 — 360
- PUBLISH TO KAFKA: ☑ — 348
- SAVE | CANCEL — 375, 375

COMPOSITION OF CUSTOM KEY PERFORMANCE INDICATORS FOR REAL-TIME ANALYSIS OF NETWORK TELEMETRY EVENTS

CROSS-REFERENCE TO RELATED APPLICATIONS

This non-provisional application claims priority to provisional application No. 62/728,356, titled "KPI Composer," filed Sep. 7, 2018. Application No. 62/728,356 is also incorporated by reference in its entirety.

BACKGROUND

Today's Telco networks can operate using multiple data centers ("DCs") that can be distributed across clouds. 5G technology is dramatically increasing network connectivity for all sorts of devices that will need to connect to the Telco network and share the physical network resources. Current network architectures cannot scale to meet these demands.

In the context of 5G networks, administrators face great difficulty in visualizing and analyzing network performance. Physical network infrastructure is often shared between tenants and virtual network functions ("VNFs") are dynamically placed throughout the network to meet changing demands. Slices of the network are often optimized for particular tasks (e.g., video streaming, internet-of-things devices, voice calls, etc.). Acceptable network performance can be relative to these diverse tasks, all of which can require different performance characteristics. Administrators need increasingly flexible ways to determine issues with network performance as the network complexity increases.

Administrators can attempt to analyze, debug, and optimize network performance based on key performance indicators ("KPIs"). The KPIs of interest can differ based on which network components and subscriber services are being analyzed. The KPIs can also be different depending on network capability. Whether a portion of the network is deployed indoors or outdoors can also change the optimal KPI analysis. Even the subscriber device itself, such as a cell phone versus a custom internet-of-things ("IoT") device, can impact the desired KPI analysis.

Current KPI analysis is constrained to a few pre-programmed real-time options. For example, ERICSSON NETWORK IQ provides one such set of pre-programmed KPIs. More in depth KPI analysis is relegated to offline computation of past data. For example, a custom application can be built on top of a platform like NEW RELIC or SPLUNK for the purposes of analyzing past performance. But such offline KPI analysis is of limited use in identifying and abating real-time network issues.

Greater real-time KPI analysis is needed in multi-cloud 5G networks, where a constantly changing virtual layer can make it necessary to identify problems in real time. Because network issues are increasingly transitory in evolution, network operators need to analyze thousands of KPIs in real time, and from a wide variety of data sources. This is computationally expensive and even infeasible with current systems.

The need for programmable KPIs for real-time analysis has increased with the rise of slice-based networks. In slice-based networks, tenants can specify guaranteed performance requirements in a service level agreement ("SLA"). An SLA can have myriad different performance minimums that are based on KPIs. For example, KPIs can measure bandwidth, throughput, round-trip time, among others. While generic KPIs can be sufficient for gauging network performance for some tenant use cases, others may require new KPIs that are used to monitor and ensure network performance in real-time.

As a result, a need exists for a system for custom KPI composition for real-time stream processing based on mobile network telemetry.

SUMMARY

Examples described herein include systems and methods for creating custom KPIs for real-time stream processing. The system can include a graphical user interface ("GUI") for KPI composition. In one example, the GUI can be used to compose a KPI definition based on available telemetry events. Hundreds of event types can exist, each with a set of attributes. The KPI definition can include a formula based around one or more of these attributes. The KPI definition can also specify how to aggregate the formula output in creating custom KPIs.

The system can also include an application programming interface ("API"), allowing for interaction with an existing real-time telemetry stream processor. The stream processor can be a process that receives an input stream of telemetry events and processes those into KPIs. In one example, a manager process can use the API to set the stream processor to apply a custom KPI definition to the input stream of events in real time. The KPI definition itself can be created in accordance with the API, for use by the stream processor. The stream processor can create an output KPI stream by applying the KPI definition to the input streams of telemetry events. The output KPI stream can then be routed to a destination by the manager process. An analytics platform at the destination can use the output KPI stream to analyze network performance.

To allow for flexible KPI creation, the GUI can display selectable events for association with variables. These events can correspond to events in the input streams at the stream processor. These available events can be determined by the manager process based on API calls to one or more real-time stream processors, in an example. The GUI can display the different events and their corresponding attributes as selectable options for use in composing a KPI definition.

In one example, the user can create a dynamic number of variables by assigning event attributes to each. The GUI can include one or more drop-down lists for each variable for use in assigning the event attributes. The GUI can also include a field where the user can input a KPI formula. The formula can be comprised of the variables. In one example, the KPI formula can also include filtering features, such as if and then statements that cause the formula to change based on thresholds. The thresholds can be defined based on the variables.

Additionally, the GUI can include an option for selecting an aggregation function. The aggregation function can define how the output of the formula is grouped, what type of aggregation formula to apply, and the time period over which to do so. For example, if grouped by session, the aggregation can group together the formula output for the same sessions over a period of time.

The manager process can store the custom KPI definition, for example, in a database. The manager process can also send code representing the KPI definition to a stream processor. The stream processor can then apply the KPI definition to the input streams to produce an output KPI stream in real time. In one example, the manager process contacts the stream processor using an API, causing the stream process to apply the KPI definition. The output stream can be directed back to the manager process, such as to a KPI dispatcher subprocess. The manager process can then route the output KPI stream to a destination.

These stages can be performed by virtual components in one or more clouds that follow a method, in an example. The stages can be part of a system that includes, for example, an application that generates the GUI and the manager process. The system can also include an analytics platform for monitoring network activity based in part on the custom KPIs. Alternatively, a non-transitory, computer-readable medium including instructions can cause a processor to perform the stages when the processor executes the instructions. The term "attribute" can broadly refer to any measurement or identifier that is part of a telemetry event.

Both the foregoing general description and the following detailed description are exemplary and explanatory only and are not restrictive of the examples, as claimed.

BRIEF DESCRIPTION OF THE DRAWINGS

FIG. 3 is an example illustration of a GUI for use in KPI composition.

DESCRIPTION OF THE EXAMPLES

Figure 1:
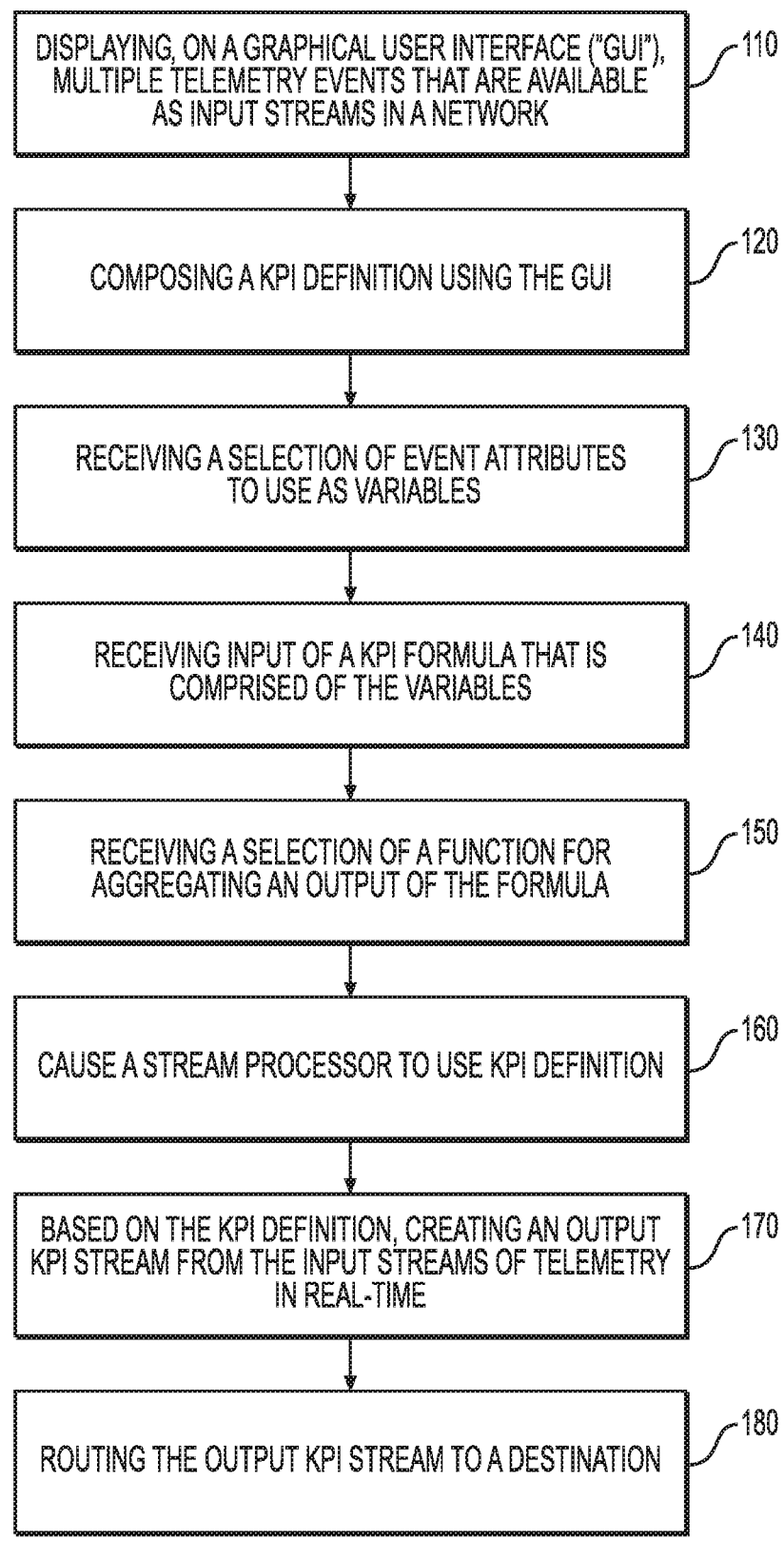
FIG. 1 is a flowchart of an example method for KPI composition using a GUI.

Reference will now be made in detail to the present examples, including examples illustrated in the accompanying drawings. Wherever possible, the same reference numbers will be used throughout the drawings to refer to the same or like parts.

In one example, the system can display a GUI that allows a user to create a custom KPI definition. The GUI can present options for defining variables based on telemetry events. The available telemetry events can be based on input streams at one or more stream processors. Different types of events can be identified by a manager process that communicates with a stream processor or other source of telemetry information. The user can select which event attributes to assign to which variables.

The user can then enter a formula that utilizes the variables. The formula can include filters, such as if and then statements that change the formula based on an event attribute value, such as a time of day, device type, or other event attributes. For example, the user can create a KPI definition that does not create an output KPI when throughput is less than a threshold. Additionally, the GUI can provide options for aggregating output of the formula. The user can specify how the aggregation is grouped, such as by session, device type, or cell. The user can also select an aggregation function, such as a histogram, that drives how the grouped formula outputs get aggregated. The options can include a time period for aggregation, such as one minute, to specify the duration over which the outputs are grouped and aggregated. The GUI can also provide options to define how long to retain the KPI definition being created by the user. The GUI can allow the user to select output units for the formula.

Based on these selections, the manager process can create a KPI definition. The KPI definition can be stored in a database and provided to the stream processor, in an example. For example, using an API call, the manager process can cause the stream processor to begin applying the KPI definition to the input telemetry events in real time. The API call can cause the KPI definition to be added to a database accessible by the stream processor, in an example.

The stream processor can then apply the KPI definition to input telemetry events. This can include applying the custom formula to the telemetry events that corresponds to the formula variables. The aggregated output forms an output KPI stream. The output KPI stream can be sent to the manager process, unlike the non-custom output KPIs of the stream processor. The manager process can then route the output KPI stream to a destination. The destination can be a KAFKA bus, a database, or a platform for analyzing KPIs and troubleshooting the network. The manager process can also monitor the KPI production to ensure that the KPI definition is not overwhelming the resources of the stream processor, and mute use of the KPI definition in cases where KPI processing becomes too slow.

By providing a way to flexibly create and add custom KPI definitions to stream processors, the system can lead to better observability, analytics, debugging and optimization of mobile networks. The system can allow mobile network operators to identify root causes of performance issues and apply fixes in the mobile network. The ability to create custom KPIs in real time can allow operators to discover root causes and find potential fixes much faster and with lower cost. An example GUI can enable operators to dynamically create custom KPIs in real time without having to wait months for vendors to implement a similar KPI. Additionally, operators can specify the aggregation granularity, unlike stock KPIs provided by vendors, which often are confined to large (i.e., overly coarse) intervals, such as 15 minutes, or grouped in ways that are less helpful to an operator user.

Together, these features synergistically reduce the time to detect serious performance issues by providing custom, real-time KPIs. Operators can quickly create, test, and implement KPI definitions on a radio access network ("RAN") or core portion of a Telco network. Operators can do this without exposing the KPI definitions to a RAN infrastructure vendor or relying on the vendor for implementation. The system can also apply to core network components. Both parts of a Telco network can generate events that can be processed into KPIs using a custom KPI definition.

FIG. 1 illustrates an example method for KPI composition using a GUI. At stage 110, the GUI can display multiple input streams of telemetry events that are available in a network. These events can be part of the input streams at a stream processor. The events can be displayed on the GUI in drop-down lists used for defining variables for a formula. The events can be organized based on which stream processor receives a corresponding input stream, in an example. This can allow the user to quickly identify events that can be compatible with one another for creating a custom KPI definition.

In one example, a manager process that operates with the GUI can communicate with a stream processor to determine which events are available. This can include making a request, such as an API call, to the stream processor to retrieve a list of events that are received in the input streams. Alternatively, the GUI includes an API that defines which events are available based on known event availability at one or more stream processors.

At stage 120, the user can compose a KPI definition by making selections on the GUI. The user can enter a name for the KPI definition. The KPI definition can be composed based on assigning event attributes to variables, assigning variables to a custom formula, and defining how the formula output is aggregated.

Addressing these steps in more detail, at stage 130 the user can assign variables to event attributes. This can include selecting an event in a drop-down list that corresponds to a first variable. The user can then select an attribute of that event. The attribute is then correlated to the first variable. For example, in a first drop-down list, the user can select a session setup event. Then, in the second drop-down list, the user can select a setup time attribute that indicates when the setup occurred.

The user can repeat this process to define more variables. The user can select an option to add an additional variable and select another event (which can be the same as the first) that will correspond to the additional variable. Then the user selects which of the attributes of that event to correlate to the additional variable. The GUI can provide options for the user to continue this selection process until all of the desired variables are assigned respective event attributes, in an example. Any number of variables can be defined. For example, the user can create a second variable and use a corresponding first drop-down list to select a session termination event. The user can then select a termination time parameter in the second drop-down list. This can indicate when the session ended.

At stage 140, the GUI can receive input of a formula that utilizes the defined variables. For example, a text box on the GUI can allow the user to type in a formula. Alternatively, a formula builder section can allow the user to construct formulas within the GUI. The formula can define how the input telemetry is transformed into an output. For example, the user can define the formula as V2-V1, which could be the end time for a session minus the start time for the session. The formula, in effect, would yield the total time of the session.

The formula can include features for filtering out some telemetry events. For example, some KPIs may be more useful when limited to particular attribute value ranges. Filters can be applied to limit the KPI to certain evolved node Bs, subscribers, device types, or time ranges. An evolved node B ("eNB") is Telco network hardware that communicates wirelessly with mobile devices. For example, if the user wants a custom KPI that corresponds to a particular device type (e.g., ANDROID), then the formula can be constructed to only output KPI values based on events corresponding to that device type. This can include making an IF/THEN statement in an example. The formula can include a condition, such as "if deviceType=ANDROID then:" to create a KPI specific to ANDROID devices. The available filtering possibilities can be a function of which telemetry events and attributes are available at the stream processor. Limiting KPI computation in this way can help eliminate noise and focus analytics as the user desires.

In one example, the formula can also include other custom KPIs. One or more variables can be assigned to a prior KPI. This can allow for creation of new KPIs based on network events and existing KPIs.

At stage 150, the GUI can provide options for aggregating the formula output. This can include selecting how the formula outputs are grouped, such as by device type, session, cell, or some other identifier that the events contain. The grouping can allow for aggregating the custom KPI across different dimensions, such as per eNB, per subscriber, or per device type. The aggregation options can also allow the user to select or define different time granularity, such as per second or per minute. The user can also select an aggregation function to use for aggregating the formula output. Functions can include maximum, minimum, sum, average, mean, or some form of histogram. For example, "minimum" can specify taking the lowest output value over the time span, whereas "mean" specifies taking the mean of output values over the time span. A histogram can be useful, for example, to see which bins are most common. Applying this to the session time formula example above, a histogram could reveal if a large number of sessions are lasting a very short or very long amount of time.

At stage 160, the manager process can cause the stream processor to use the KPI definition. This can include programming the stream processor to use the KPI definition or pointing the stream processor to a location for the KPI definition. In one example, the manager process makes an API call to the stream processor to activate the KPI definition. This can include sending code to the stream manager. The stream manager can add the KPI definition to a group of KPI definitions being used to create output KPIs from the input telemetry streams at stage 170. The manager process can control the ongoing availability of the KPI definition at the stream processor. This can include moving or deleting the KPI definition from storage and the stream processor after a period of use has elapsed.

To create an output KPI stream at stage 170, the stream processor can apply the KPI definition to the corresponding input streams of telemetry events in real time. This can include matching the event attributes to those of the formula and aggregating the formula output based on the KPI definition. The result can be an output stream of composed KPIs. The manager process can receive that output KPI stream from the stream processor. Conversely, the stream processor can send the regular KPIs (not created from the custom KPI definition) elsewhere. Then, at stage 180, the manager process can route the output KPI stream to a destination. The destination can be, for example, a file system, database, web service, or application backend. The output KPI stream can be analyzed at the destination to make network insights and troubleshoot.

Figure 2:
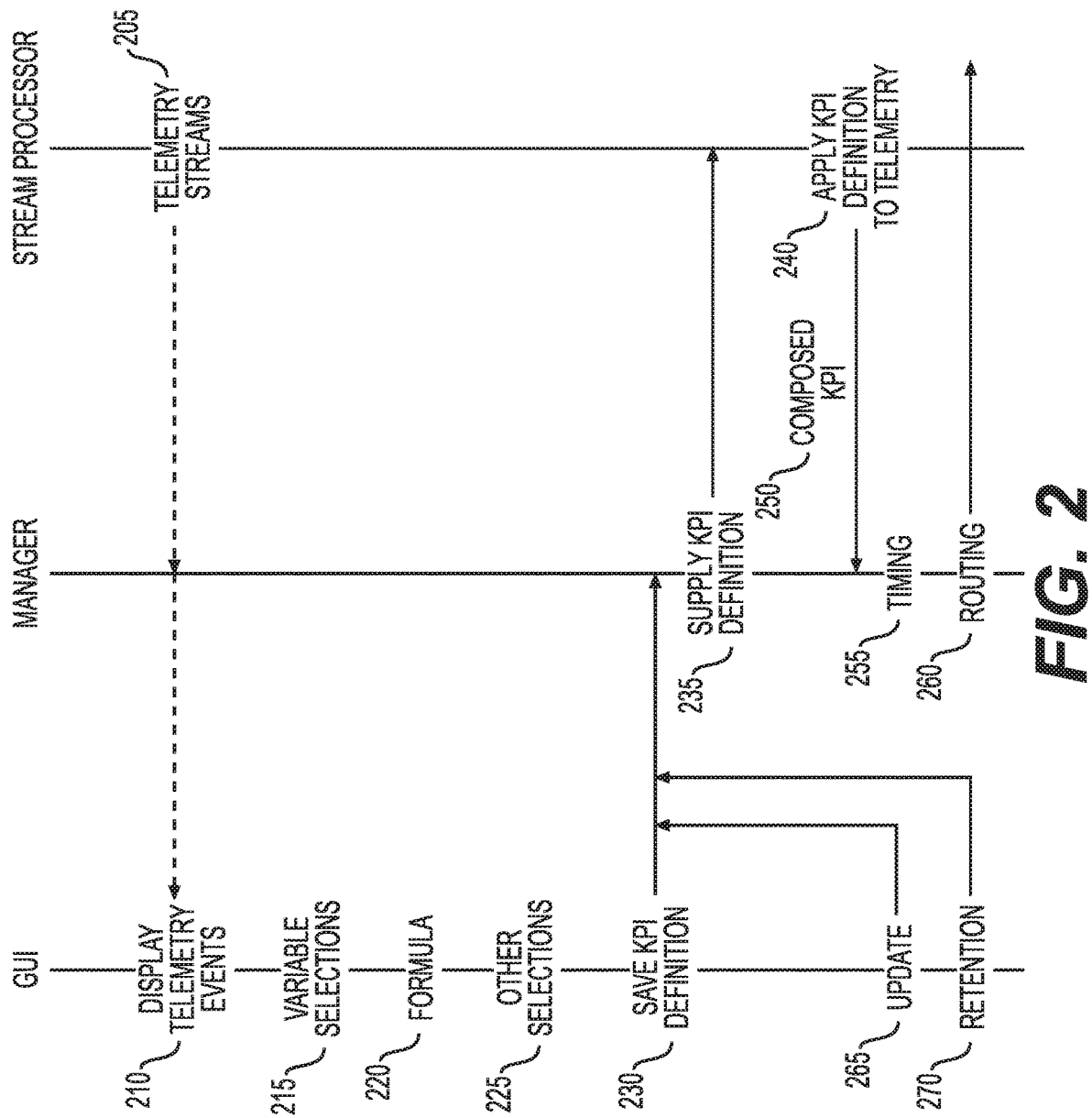
FIG. 2 is an example illustration of a sequence diagram for KPI composition using a GUI.

FIG. 2 is an illustration of an example sequence diagram for KPI composition using a GUI. At stage 205, the stream processor receives streams for network telemetry events. The streams can be received from various components of a network. Both physical hardware and virtualized components can report telemetry events. The telemetry events can be diverse. For example, when a connection to a virtual component such as a VNF begins, the virtual component can generate a setup event. When the connection ends, a termination event can be generated. Each event can have its own format with various attributes (also referred to as measurements). When events are received as part of input streams, these attributes can have values that are used to describe the event. Generally, a telemetry event can be generated with attributes describing a performance aspect of the network component. The stream processor can create KPI output streams by applying KPI definitions to the input streams of telemetry events (and the respective attribute values).

In particular, the formula of the KPI definition can include variables that map to measurements within particular event types. The formulas of the KPI definitions can be applied to the streams (of events) based on how the user selected the data to be grouped, such as by cell, session, device type, or subscriber. The grouping, therefore, can dictate how the events are tied together for application to the formula. The stream processor can apply multiple such KPI definitions to input telemetry streams to produce corresponding output KPI streams.

At stage 210, a GUI can display available telemetry events that can be used for composing custom KPI definitions. The events displayed can correlate to the various input streams of telemetry events received at the stream processor. In one example, a manager process communicates with the stream processor using an API to determine which events to make available at the GUI. In another example, the GUI displays events that are included in a database of compatible events. The events can be displayed in drop-down boxes that are used for assigning variables to event measurement values, as will be explained.

At stage 215, the user can assign variables to measurements of the input stream events. To do this, the user can select which event corresponds to the variable from a drop-down box of available events. Again, the drop-down box can be populated based on which input streams of events the stream processor has access to. As an example, the drop-down list can include a "begin flow" event. This event could be generated when a new flow is created at a virtual switch.

The user can select this event, causing a corresponding second drop-down box to display various attributes (e.g., measurements) available for that event. Measurements can vary between events but can include information such as a last transmission time interval, a timestamp, a session identifier, and other information relevant to the particular event. Events can follow respective formats that dictate which measurements the event will contain. These formats can be known at the GUI, such as by a database lookup. Alternatively, the manager process can obtain measurements included in an event through an API that includes functions for retrieving the different measurements contained within the event. For example, for the "begin flow" event, the user can select an attribute that measures a first transmission time.

The user can repeat this process to define additional variables based on event attributes. For example, the user could define a second variable based on an "end flow" event and select an end transmission time attribute for the second variable. The GUI can provide a button to continue adding variables. For each variable, the user can select a corresponding attribute of another event. Attributes from the same or different events can be assigned to the different variables. Variables can also be defined to include measurements from different events.

In one example, the GUI limits which events and attributes (e.g., measurements) can be selected based on compatibility. For example, a first event may include a first type of identifier, such as to a session or a device identifier. If a second event also includes the first type of identifier, it can be deemed compatible and appropriate for selection. This can cause the GUI to display the second event in a drop-down box for selection in association with the second variable. However, in one example, the GUI can exclude events from selection when those events do not have any common identifier with the first event. This can prevent the creation of formulas where the variables cannot be related to one another in a meaningful way, in an example. For example, if the user were to select an event regarding cell transmission, and another event regarding processor load, it is possible that these events would not share a common identifier that would allow for linking them to compute a formula output.

The formulaic relationship between the variables can be based on the user selection of a "group by" value. For example, the user can select to group events by session, device type, cell, or other common identifiers that can be included as measurements within the event. The formula can therefore compute outputs based on variables for a common device, network component, session, or device type, among other possible groupings. The formula can be applied separately to each group of event attribute values, in an example.

At stage 220, the GUI can receive user input to specify the formula that implements the variables. The formula can be in the form of an equation that contains the variables defined previously on the GUI. In one example, the GUI allows the user to type a formula into a text field. In another example, formula builder GUI components allow the user to select variables, mathematical operators, and create conditional blocks.

The formula can also include filters such that the formula changes based on a condition, such as device type. For example, conditional blocks can be entered that identify particular device types, allowing the formula to apply different operations to the different device types. These conditions can also be written into the formula by use of IF/THEN statements, in an example.

At stage 225, the user can make additional selections that govern how the formula is applied. For example, the GUI can have a section for aggregating the output of the formula. The GUI can allow the user to aggregate the custom KPI across different group dimensions and different time resolutions (e.g., per second, per minute, etc.) based on different aggregation functions (e.g., min, max, mean, sum, histogram etc.). In more detail, aggregation can include the selection of how the events used in the formula will be grouped. This can allow the user to aggregate the custom KPI across different dimensions, such as per eNB, per subscriber, or per device type.

The aggregation section can also have an option for selecting an aggregation function that governs how the aggregation will work. Example aggregation functions can include maximum, minimum, mean, and one or more variants of histogram functions. A histogram can group the formula output into different bins. The histogram can also separate formula results based on user-definable bin boundaries. Bin boundaries can include values that define which bin of the histogram to count based on the formula output for a session.

The user can also select the time granularity over which the aggregation function is applied. For example, the user can select one minute and a maximum function. With those selections, the KPI can represent a maximum formula output over a one-minute span. As another example, a histogram can segregate outputs from the formula over the time span. The segregated outputs can be according to bin boundaries, which can be keyed to the formula output.

Still other selections at stage 225 can include naming the custom KPI, such as by typing a name into a text field. The user can also select how long the KPI definition should be maintained. This can allow the manager process to automatically prevent the stream processor from continuing to use the KPI definition after a period of time. The GUI can also allow the user to select a destination, such as a KAFKA bus, for the output KPI stream.

At stage 230, the user can save the KPI definition. This can be done using buttons on the GUI. The system can store the KPI definition in a database. The KPI definition can contain the formula and corresponding variables selected by the user, the aggregation information, filters, retention time, and output stream destination.

At stage 235, the manager process can supply the stream processor with the KPI definition. In one example, the manager process makes API calls to the stream processor, reprogramming the stream processor to apply the custom KPI definition to the input streams of telemetry events. In another example, the manager process can notify the stream processor of a location of the custom KPI definition. The stream processor can then retrieve the KPI definition.

At stage 240, the stream processor can apply the custom KPI definition to the input telemetry streams. This can occur in real time and result in an output KPI stream. The output KPI stream can include a series of composed KPIs based on aggregated output of the formula in the KPI definition.

At stage 250, the output KPI stream (of composed KPIs) can be sent to a dispatch process. The dispatch process can route the composed KPIs to a destination. The dispatch process can execute as part of the manager process, in an example. For the purposes of this disclosure, even when two separate processes operate for managing the KPI definition and routing the composed KPIs, the manager process can be considered to comprise both.

In one example, the stream processor sends the custom composed KPIs to the manager process for routing but sends other non-custom KPIs to other pre-defined destinations. The manager process can flexibly route the composed KPIs to various destinations at stage 260 without additional setup needed by the stream processor provider. The destination can include a KAFKA bus in one example. Other destinations can include a database, an application running a GUI for analyzing the network, and other locations.

In one example, at stage 255, the manager process or stream processor can determine whether too much compute time or resources are required to implement the KPI definition. This can be measured based on either start and end times for creating a composed KPI or based on measurement of resource utilization during KPI composition. If a threshold is reached, then the manager process can mute the KPI definition and alert a user regarding the mute status. To mute the KPI definition, the manager process can contact the stream processor, causing the stream processor to remove the KPI definition from its pool of definitions being applied. The alert can be in the form of a text, email, or a display on a GUI.

In response to the alert or on their own volition, the user can update a KPI definition at stage 265. This can include changing the formula, variables, aggregation selections, or any other selections and saving an updated KPI definition at stage 230. From there, the manager process can cause the stream processor to implement the updated KPI definition at stage 235.

Additionally, the user can make selections at stage 270 regarding how long the KPI definition should be retained and utilized. This retention information can be stored as part of the KPI definition at stage 230, in an example. The manager process can then monitor whether the retention period has ended. When it ends, the manager process can contact the stream processor, causing the stream processor to stop applying the KPI definition to the input telemetry streams.

FIG. 3 is an example illustration of a GUI screen 300 for composing a KPI definition. A first field 305 can allow the user to enter a name of the custom KPI. Tags can be added based on option 307. Tags can be shorthand references for identifying or grouping KPIs within analytics platforms. For example, a session tag can be used to identify different KPIs that each are grouped by session. An analytics platform that uses the composed KPIs can display the tags to help an operator identify the composed KPIs within a user interface. KPIs that share the same tag can be grouped together in an example. In one example, even formulas can include other KPIs, in effect creating a custom KPI from variables and other KPIs. The tags can allow a user to locate compatible KPIs that are grouped the same way, for example.

Variables 310 can be defined on the GUI for use in a formula. The number of variables 310 can vary based on the formula and the custom KPI definition that the user wishes to create. In this example, the user has defined three variables 310, labelled V1, V2, V3. The user can add additional variables using button 335 and delete a variable using button 330. The first variable 315, V1, is assigned a first event based on event drop-down box 320. This first event is called BEARER TRAFFIC REP. In this particular example, all three variables 310 are based on the BEARER TRAFFIC REP event. But in other examples, a user can select different events for some or all of the variables. The BEARER TRAFFIC REP event is an event type related to a network traffic report but can be only one of many different events available based on the input telemetry streams. In one example, the traffic report is generated along with a termination report. For example, a setup event can be generated when a session begins, and a termination event can be generated when a session ends. All of these events can be selectable in the GUI for assignment to the variables 310, in an example.

Selecting the first event at drop-down 320 can cause an attribute drop-down 325 to populate with corresponding event attributes. These attributes can be measurements or other information that are included for the event selected in drop-down 320. Each event can include a definition or API that identifies which attributes the event includes. The attribute drop-down 320 can populate on this basis.

In this example, the event attributes assigned to the three variables 310 all differ. The event attribute for V1 can represent acknowledged volume on downlink. The selected attribute for V2 can represent a last transmission time interval. This value can represent the time for the last burst in a transmission, which can be an incomplete burst that an operator may wish to exclude from KPI calculations. The selected attribute for V3 can represent throughput time downlink, which can reflect how much time a downlink was active. In this example, these attributes are all selected from multiple attributes belonging to the event, BEARER TRAFFIC REP.

A formula field 340 can allow the user to type a formula. The formula can specify how the variables 310 interact with one another to define the custom KPI. This custom KPI definition relates to throughput. One measure of throughput can be achieved based on the formula: V1−V2/V3. However, the custom formula here multiplies by 8 and divides by 1000 to normalize or calibrate the formula output for KPI analysis at a destination. Different formulas are possible for different KPI definitions. For example, if the first variable is a setup event and the second variable is a termination event, a KPI for duration of network activity can be created with the formula V2−V1.

Output units of the formula can be selected in drop-down 345. This can allow the composed KPIs to contain unit information for clearer presentation at a destination. The available options in drop-down 345 can be pre-populated, in an example, based on the units of measurement associated with the previously selected event attributes and the operations performed in formula field 340. The available options in drop-down 345 can serve as confirmation to a user that the operations applied to the selected event attributes will yield the expected result.

The GUI can also provide selections for aggregating the output of the formula. For example, a grouping selection 348 allows the user to determine how the formula output will be grouped. This also can dictate how event attributes are grouped when the formula is applied to an input telemetry stream. The stream processor for the mobile network can join events from multiple sources together based on the grouping selection 348.

The grouping selection 348 can be another drop-down box with different granularity grouping options. The possible grouping options can correspond to common identifiers between the events of the variables 310, in an example. In this example, the user has selected to group by cell, which can radio cells within the network. Another option could be to group by eNB. A single eNB can include multiple cells. Other grouping granularities can include session, subscriber, or device type (e.g., APPLE or SAMSUNG). This information can be used to connect the events and their attributes for application within the formula. For example, a single session can represent a view of the event attributes. The formula can operate on one view at a time.

The user can select an aggregation function at option 350. The aggregation function can determine how the formula outputs are aggregated together for the selected group. A minimum function can be selected to provide a minimum value of formula outputs over an aggregation period. A maximum function can instead provide the maximum value. A mean or average can likewise be selected for application to the formula outputs over an aggregation period.

Option 350 can also include one more variants of histogram functions. The histogram can group formula outputs based on output values defined as bin boundaries in field 360. In this example, the bin boundaries are separated by commas and represent output ranges that define histogram bins. This can allow the user to, for example, determine how many sessions are meeting particular attribute thresholds.

The aggregation can be over a time period selected at option 355. In this example, the selected time period is one minute. But other time granularities are also selectable, such as one second or an hour.

The aggregation can therefore apply the group (e.g., cell), function (e.g., histogram), and time (e.g., one minute) to the formula output in creating composed KPIs. Each composed KPI can be created based on the aggregation selections. For example, if the user selects to group by session, it is possible that 10,000 sessions can be aggregated by the stream processor to create an output KPI stream with 10,000 composed KPIs.

In one example, the GUI also allows the user to add filters as part of the aggregation. For example, the user can set a filter to ignore sessions that transacted less than ten kilobytes of data. When a session is responsible for such low data, the session may produce more noise than value in the analytics. In another example, the filtering can be built into the formula itself, such as with IF/THEN or CASE statements in the formula field 340.

A retention selection 365 can allow the user to specify how long the KPI definition should be utilized at the stream processor. In this example, the KPI definition can be active for 60 days. After the selected time period expires, the manager process can remove the KPI definition or suspend further use at the stream processor.

Another selection 370 can be provided for selecting a destination for the output KPI stream. In this example, the selection 370 indicates that the destination is a KPI bus. The stream processor can send the output KPI stream to the manager process in one example, which can then route the KPIs to the selected destination.

The GUI screen 300 can also include buttons 375, 380 for saving the KPI definition or canceling. If the user selects to save, then the KPI definition can be stored. The manager process can then cause the stream processor to utilize the KPI definition (among other existing definitions). To do this, in one example the manager process can insert code into the stream processor. The stream processor can output a stream of composed KPIs based on the KPI definition. This output stream can be routed to a destination specified in the KPI definition.

Figure 4:
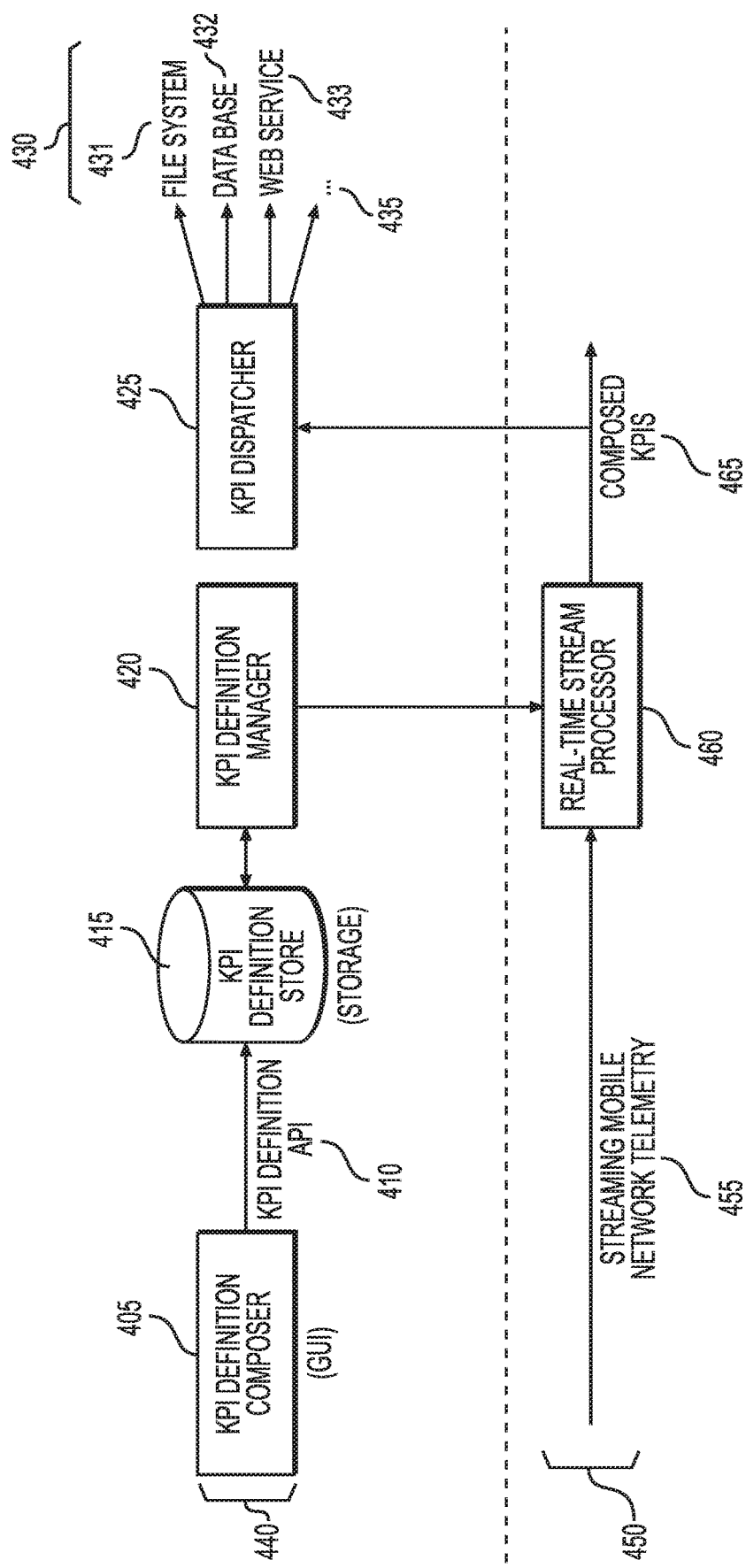
FIG. 4 is an example illustration of system components for KPI composition using a GUI.

FIG. 4 is an example illustration of system components for composition of KPIs for real-time analysis of network telemetry events. An application for KPI composition can utilize components 440, in an example. These components 440 can integrate with a network telemetry streaming platform 450 to apply custom KPI definitions 410 for real-time telemetry processing. The system can then route the resulting output KPI stream to a destination 430.

In one example, the components 440 can be part of an application that includes a KPI definition composer 405, which can include a GUI such as that of FIG. 3. The GUI can execute on a computing device, such as a cell phone, tablet, laptop, or any other processor-enabled device. Based on selections at the GUI, the user can create a KPI definition 410.

The KPI definition 410 can be stored in a database 415 or some other non-transitory, computer-readable storage medium. The KPI definition 410 can reflect the selections the user made on the GUI. These selections can define variables based on event attributes, specify a formula based on the variables, and assign an aggregation scheme to the formula.

A manager process 420 can manage the use of the KPI definition 410 at a stream processor 460. The manager process 420 can run as part of the application with the GUI 405 in an example. The manager process 420 can retrieve a custom KPI definition 410 from the GUI or database 415 and supply the KPI definition 410 to the stream processor 460. In one example, the manager process 420 can insert code into the real-time stream processor 460. The code can be based on the KPI definition 410, causing the stream processor 460 to process network telemetry events based on the KPI definition 410.

The stream processor 460 can execute remotely from the manager process 420 and GUI 405 application, in an example. The manager process 420 can utilize an API to cause the stream processor 460 to start or stop using a KPI definition in an example.

The stream processor 460 can receive input streams of telemetry events 455. These events 455 can be generated by various components of the network and routed to the stream processor 460. The components that generate events can be virtual components, such as virtual machines, VNFs, and virtual switches. Physical components can also generate events. For example, eNBs, cells, server hardware, and various cards can generate events 455.

The stream processor 460 can create composed KPIs 465 by applying one or more KPI definitions 410 to the events 455 of the input telemetry streams. Using the input telemetry streams, the stream processor 460 can identify event attributes in the formula for the custom KPI. The stream processor 460 can apply the formula and aggregate the formula output according to group, function, and time. This can mean applying the formula for multiple views, where each view links the variables according to the group, in an example.

The result is an output stream of composed KPIs 465. Composed KPIs 465 created based on the KPI definition can be sent to a KPI dispatcher 425. This can allow the components 440 to flexibly control where the output KPI stream is routed. But other composed KPIs 465 that are not based on the custom KPI definition 410 can be routed by the stream processor 460 to different destinations.

The KPI dispatcher 425 can be a process that is responsible for routing the output KPI stream to a destination 430. The KPI dispatcher 425 can be considered part of the manager process 420 even if a different process manages the KPI definition 410.

The destination 430 can be specified in the KPI definition 410, in an example. Possible destinations include a file system 431, database 432, and web service 333. Other destinations 435, such as a KAFKA bus, are also selectable in some examples.

Once the composed KPIs 465 are at the destination 430, an analytics platform can use the composed KPIs 465 to diagnose issues within the network.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for key performance indicator ("KPI") composition, comprising:
   displaying, on a graphical user interface ("GUI"), events that correspond to input telemetry streams that are available in a network;
   composing a KPI definition on the GUI based on:
      receiving selections to define variables based on attributes of at least one of the events;
      receiving input of a KPI formula that is comprised of the variables; and
      receiving a selection of a function for aggregating an output of the formula; and
   causing a stream processor to apply the KPI definition to create an output KPI stream, wherein the stream processor applies the KPI definition to the input telemetry streams in real-time.

2. The method of claim 1, further comprising setting, on the GUI, a retention period for the KPI definition, wherein access to the KPI definition by the stream processor is removed after the retention period ends.

3. The method of claim 1, further comprising:
   determining, by a manager process, that a timing threshold is exceeded for creating the KPI stream;
   muting the creation of the output KPI stream from the KPI definition; and
   issuing an alert regarding the muting.

4. The method of claim 1, wherein the output KPI stream is routed to a destination selected on the GUI, and wherein the destination includes at least one of a file system, a database, and a web service.

5. The method of claim 1, further comprising:
   receiving selections on the GUI to update the KPI definition; and
   contacting the stream processor to cause the stream processor to apply the updated KPI definition.

6. The method of claim 1, wherein composing the KPI definition is further based on receiving a grouping selection that determines how event attributes are grouped together in applying the formula to the input telemetry streams.

7. The method of claim 1, wherein the KPI definition includes filtering criteria that causes the stream processor to apply the formula differently based on different event attribute values.

8. A non-transitory, computer-readable medium comprising instructions that are executed by a processor to perform stages for key performance indicator ("KPI") composition, the stages comprising:
   displaying, on a graphical user interface ("GUI"), events that correspond to input telemetry streams that are available in a network;
   composing a KPI definition on the GUI based on:
      receiving selections to define variables based on attributes of at least one of the events;
      receiving input of a KPI formula that is comprised of the variables; and
      receiving a selection of a function for aggregating an output of the formula; and
   causing a stream processor to apply the KPI definition to create an output KPI stream, wherein the stream processor applies the KPI definition to the input telemetry streams in real-time.

9. The non-transitory, computer-readable medium of claim 8, the stages further comprising setting, on the GUI, a retention period for the KPI definition, wherein access to the KPI definition by the stream processor is removed after the retention period ends.

10. The non-transitory, computer-readable medium of claim 8, the stages further comprising:
    determining, by a manager process, that a timing threshold is exceeded for creating the KPI stream;
    muting the creation of the output KPI stream from the KPI definition; and
    issuing an alert regarding the muting.

11. The non-transitory, computer-readable medium of claim 8, wherein the output KPI stream is routed to a destination selected on the GUI, and wherein the destination includes at least one of a file system, a database, and a web service.

12. The non-transitory, computer-readable medium of claim 8, the stages further comprising:
    receiving selections on the GUI to update the KPI definition; and
    contacting the stream processor to cause the stream processor to apply the updated KPI definition.

13. The non-transitory, computer-readable medium of claim 8, wherein composing the KPI definition is further based on receiving a grouping selection that determines how event attributes are grouped together in applying the formula to the input telemetry streams.

14. The non-transitory, computer-readable medium of claim 8, wherein the KPI definition includes filtering criteria that causes the stream processor to apply the formula differently based on different event attribute values.

15. A system for key performance indicator ("KPI") composition, comprising:
- a non-transitory, computer-readable medium containing instructions; and
- a processor that executes the instructions to perform stages comprising:
  - displaying, on a graphical user interface ("GUI"), events that correspond to input telemetry streams that are available in a network;
  - composing a KPI definition on the GUI based on:
    - receiving selections to define variables based on attributes of at least one of the events;
    - receiving input of a KPI formula that is comprised of the variables; and
    - receiving a selection of a function for aggregating an output of the formula; and
  - causing a stream processor to apply the KPI definition to create an output KPI stream, wherein the stream processor applies the KPI definition to the input telemetry streams in real-time.

16. The system of claim 15, the stages further comprising setting, on the GUI, a retention period for the KPI definition, wherein access to the KPI definition by the stream processor is removed after the retention period ends.

17. The system of claim 15, the stages further comprising:
- determining, by a manager process, that a timing threshold is exceeded for creating the KPI stream;
- muting the creation of the output KPI stream from the KPI definition; and
- issuing an alert regarding the muting.

18. The system of claim 15, wherein the output KPI stream is routed to a destination selected on the GUI, wherein the destination includes at least one of a file system, a database, and a web service.

19. The system of claim 15, the stages further comprising:
- receiving selections on the GUI to update the KPI definition; and
- contacting the stream processor to cause the stream processor to apply the updated KPI definition.

20. The system of claim 15, wherein the KPI definition includes filtering criteria that causes the stream processor to apply the formula differently based on different event attribute values.

* * * * *